(12) United States Patent
Kwan et al.

(10) Patent No.: US 9,209,646 B2
(45) Date of Patent: Dec. 8, 2015

(54) WIRELESS COMMUNICATION DEVICE WITH CONNECTION RESTORATION AND METHODS FOR USE THEREWITH

(71) Applicant: BROADCOM CORPORATION, Irvine, CA (US)

(72) Inventors: Chikan Kwan, San Diego, CA (US); Xin Tian, San Diego, CA (US); Erik John Rivard, San Diego, CA (US); Xianbo Chen, San Diego, CA (US); Lih-Feng Tsaur, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 177 days.

(21) Appl. No.: 13/965,957

(22) Filed: Aug. 13, 2013

(65) Prior Publication Data
US 2015/0028799 A1    Jan. 29, 2015

Related U.S. Application Data

(60) Provisional application No. 61/859,492, filed on Jul. 29, 2013.

(51) Int. Cl.
*H02J 7/02* (2006.01)
*H02J 17/00* (2006.01)
*H04B 5/00* (2006.01)

(52) U.S. Cl.
CPC .............. *H02J 7/025* (2013.01); *H02J 17/00* (2013.01); *H04B 5/0037* (2013.01)

(58) Field of Classification Search
CPC ........................................................ H02J 7/025
USPC ........................................................ 320/108
See application file for complete search history.

(56) References Cited

U.S. PATENT DOCUMENTS

2011/0121654 A1*   5/2011   Recker et al. .................. 307/66

* cited by examiner

*Primary Examiner* — Thuan Do
(74) *Attorney, Agent, or Firm* — Garlick & Markison; Bruce Stuckman (57) ABSTRACT

A wireless communication device includes a wireless charging circuit configurable to receive a wireless power signal from a power transmitting unit and to charge the wireless communication device under control of a processing device and in conjunction with a charging session with the power transmitting unit. A wireless interface device operates under control of the processing device to establish a wireless connection with the power transmitting unit via a connection establishment procedure, wherein the wireless connection is separate from the wireless power signal. Control data is exchanged with the power transmitting unit via the wireless connection, wherein the control data is used by the processing device to implement the charging session with the wireless charging circuit. A response is generated to a disruption event of the wireless communication device that includes implementing a restoration procedure for restoring the wireless connection, without implementing the connection establishment procedure.

20 Claims, 7 Drawing Sheets

WIRELESS COMMUNICATION DEVICE WITH CONNECTION RESTORATION AND METHODS FOR USE THEREWITH

CROSS-REFERENCE TO RELATED APPLICATIONS

The present application claims priority under 35 U.S.C. 119 to provisionally filed application Ser. No. 61/859,492, entitled, "WIRELESS COMMUNICATION DEVICE WITH CONNECTION RESTORATION AND METHODS FOR USE THEREWITH," filed on Jul. 29, 2013, expired, which is hereby incorporated herein by reference in its entirety and made part of the present U.S. Utility patent application for all purposes.

BACKGROUND TECHNICAL FIELD

Various embodiments relate generally to wireless communication systems and also to wireless charging of devices.

DESCRIPTION OF RELATED ART

Communication systems are known to support wireless and wireline communications between wireless and/or wireline communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, Bluetooth Low Energy (BLE), advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

The Alliance for Wireless Power (A4WP) has promulgated a baseline systems specification for interoperability of loosely coupled wireless power transfer for portable, handheld electronic devices. This specification supports a 6.78 MHz for power transfers and a 2.4 GHz operating frequency for management data transfers.

DETAILED DESCRIPTION

Figure 1:
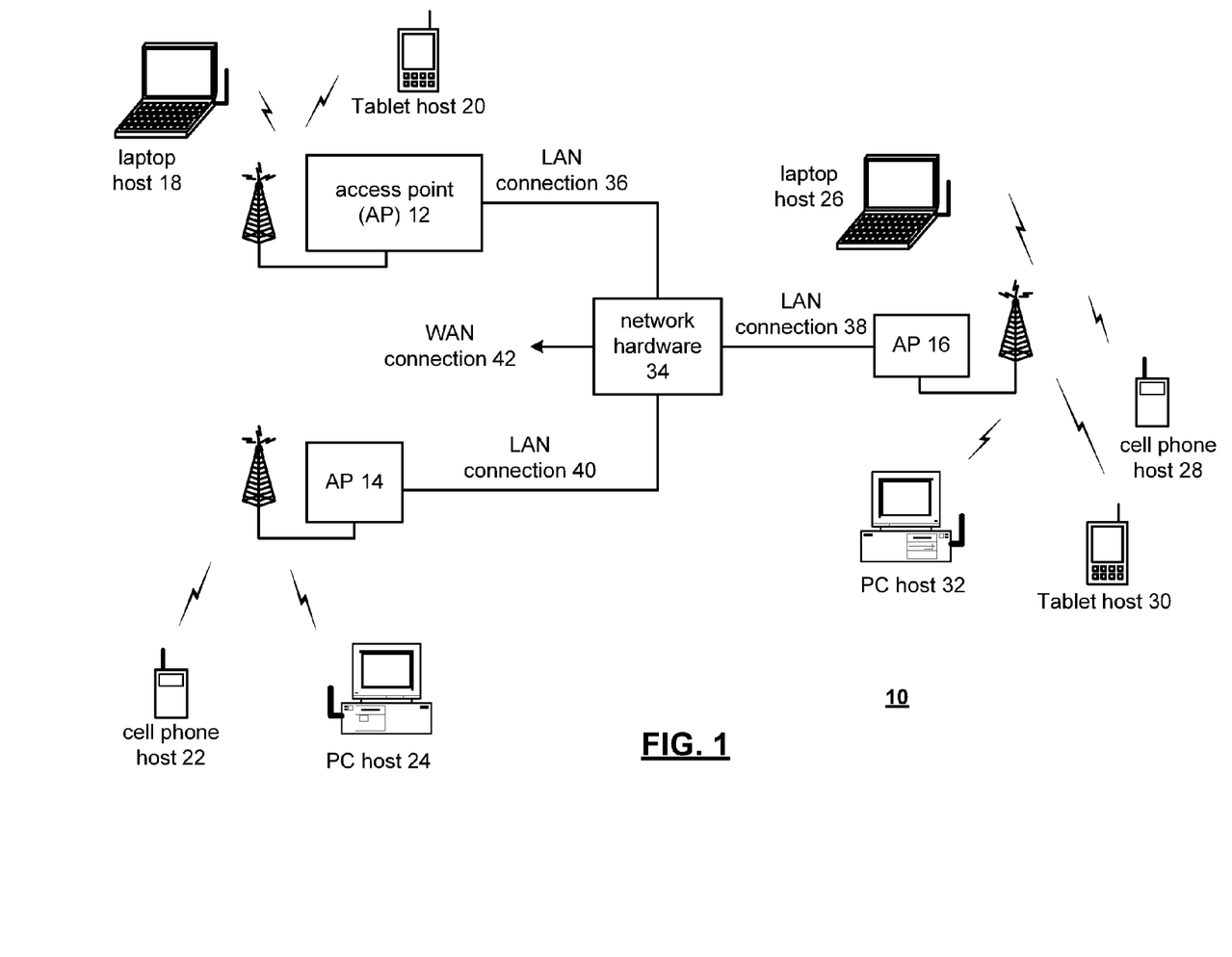
FIG. 1 is a schematic block diagram of an embodiment of a wireless communication system.

FIG. 1 is a schematic block diagram illustrating a communication system 10 that includes a plurality of access points 12-16, a plurality of wireless communication devices 18-32 and a network hardware component 34 (for example, a bridge, switch or router). The wireless communication devices 18-32 may be laptop host computers 18 and 26, tablet hosts 20 and 30, personal computer hosts 24 and 32, cellular telephone hosts 22 and 28 and/or other wireless devices.

The access points 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the access points 12-16 has an associated antenna or antenna array to communicate with the wireless communication devices in its area. Typically, the wireless communication devices register with a particular access point 12-16 to receive services from the communication system 10. For direct connections (i.e., point-to-point communications), wireless communication devices communicate directly via agreed upon frequencies.

Typically, access points 12-16 are used for in-home or in-building wireless networks however, base stations can similarly be employed, for instance, for cellular telephone systems and like-type systems. Regardless of the particular type of communication system, each wireless communication device includes a built-in radio and/or is coupled to a radio.

In an embodiment, one or more of the communication devices 18, 20, 22, 24, 26, 28, 30 and 32 operate over an additional wireless network, such as a wireless personal area network. For example, the access points 12, 14 and 16 could operate in accordance with a wireless local area network protocol such as an IEEE 802.11 protocol and one or more wireless communication devices 18, 20, 22, 24, 26, 28, 30 and 32 could operate using Bluetooth. In this case, IEEE 802.11 and Bluetooth communications could both use the 2.4 GHz frequency band. For instance, the laptop host 18 may communicate via Bluetooth technology such as Classic Bluetooth (IEEE 802.15.1) Bluetooth LE (Bluetooth 4.0) or other Bluetooth technology with a keyboard, a mouse, a printer, a mobile phone, a tablet, and/or a set of headphones or speakers. These devices and the laptop host 18 may form an ad-hoc Bluetooth piconet. Generally, a Bluetooth piconet may comprise a master device or terminal and up to seven slave devices or terminals. In this exemplary implementation, the laptop host 18 may correspond to the master Bluetooth terminal and be coupled to one or more the peripheral devices, such as a headset, printer, keyboard, pointing device or other peripheral devices that may correspond to the slave Bluetooth terminals. Similarly, cell phone host 22 could communicate via Bluetooth technology with a Bluetooth headset and place wireless telephone calls, such as a voice over IP call placed via an access point or via 3G or 4G call placed via a base station.

In an embodiment, wireless connections are established between two or more wireless communication devices 18, 20, 22, 24, 26, 28, 30 and/or 32. The process of establishing a wireless connection between two devices can include several steps involving the exchange of information. In Bluetooth LE, for example, when the connection is disrupted, for example by a system reset of a device, the device would respond by restarting its advertisement. Supervision timeout on the peer device would meanwhile occur. The peer device would thereafter re-issue a connection request after seeing the new advertisement. In 802.11, the association process between a station and an access point also requires information to be exchanged between the access point and the station. If the wireless connection is lost because, for example, a disruption occurs in communication or one device unilaterally drops the connection, the connection establishment is repeated.

In an embodiment, a wireless communication device is able to implement a restoration procedure that restores a wireless connection without repeating the full connection establishment. When a disrupting event occurs, such as a system reset or other disruption, one or more connection events as well as link synchronization information might be missing on the disrupted device. Once the disrupted device comes back online, instead of advertising again for new connection establishment, the device restores the wireless connection with the other device, before the other device drops the connection. For example, the disrupted device can open up a wide reception window on the expected channel to strive for the estimated connection event before the supervision timeout expires on the other device. When this succeeds, the other device is agnostic of the disruption.

The wireless communication devices 18, 20, 22, 24, 26, 28, 30 and/or 32 can include one or more features of the various embodiments described in greater detail with reference to FIGS. 2-9.

Figure 2:
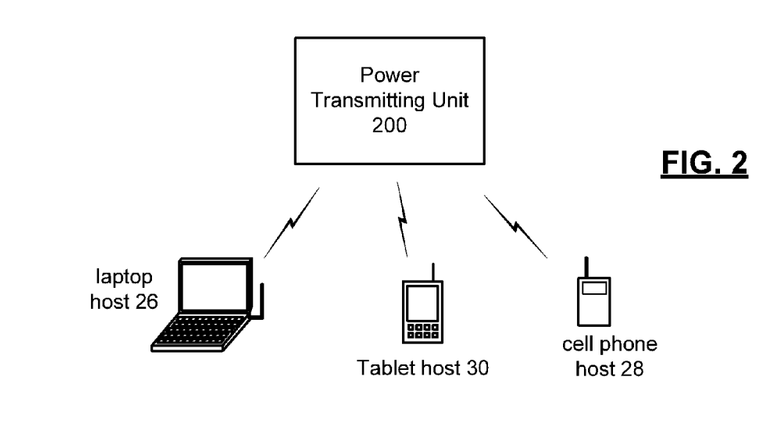
FIG. 2 is a schematic block diagram of an embodiment of a wireless charging system.

FIG. 2 is a schematic block diagram of an embodiment of a wireless charging system. The embodiments described in conjunction with FIG. 1 were primarily directed to wireless connection used directly to carry network communications to and from a wireless communication device—such as real-time or non-real-time voice and data communications. The principles of various embodiments described herein also have applicability to wireless connections used primarily for other purposes such as control signaling, administrative links, etc. An example of such a system is presented where a wireless connection is used in conjunction with a wireless charging system.

A power transmitting unit 200 is shown for wirelessly charging a number of wireless devices such as laptop host 26, tablet host 30 and/or cellphone host 28. While specific devices are shown, the wireless communication devices 18, 20, 22, 24, 26, 28, 30 and/or 32 and corresponding peripheral devices, such as a keyboard, a mouse, a printer, a microphone, headset, headphones, speakers or other peripheral can each be wirelessly charged via a power transmitting unit, such as a power transmitting unit 200. While shown as a separate device, the power transmitting unit 200 can be incorporated in a server, an access point, an article of furniture, or any other device that can be placed or is otherwise located in proximity to the devices to be charged.

In one example of operation, power transmitting unit (PTU) 200 can operate in accordance with a loosely coupled wireless power transfer specification such as the A4WP baseline system specification 1.0 (BSS 1.0) or other wireless power transfer technology. In this embodiment, the laptop host 26, tablet host 30 and/or cellphone host 28 operates as a power receiving unit (PRU). In this example, a 6.78 MHZ signal is sent from the power transmitting unit 200 to the PRUs to transfer energy to charge each device in conjunction with a charging session for each device. Control information is exchanged between the PTU 200 and each of the PTUs via a 2.4 GHz Bluetooth LE compatible link to control the power transfer to the PRU.

In operation, a wireless connection is established been the PTU 200 and a corresponding wireless communication device such as laptop host 26, tablet host 30 or cellphone host 28 via Bluetooth LE. If a disrupting event occurs at the wireless communication device, such as a system reset or other disruption, the wireless communication device is able to implement a restoration procedure that restores a wireless connection without repeating the full connection establishment.

Figure 3:
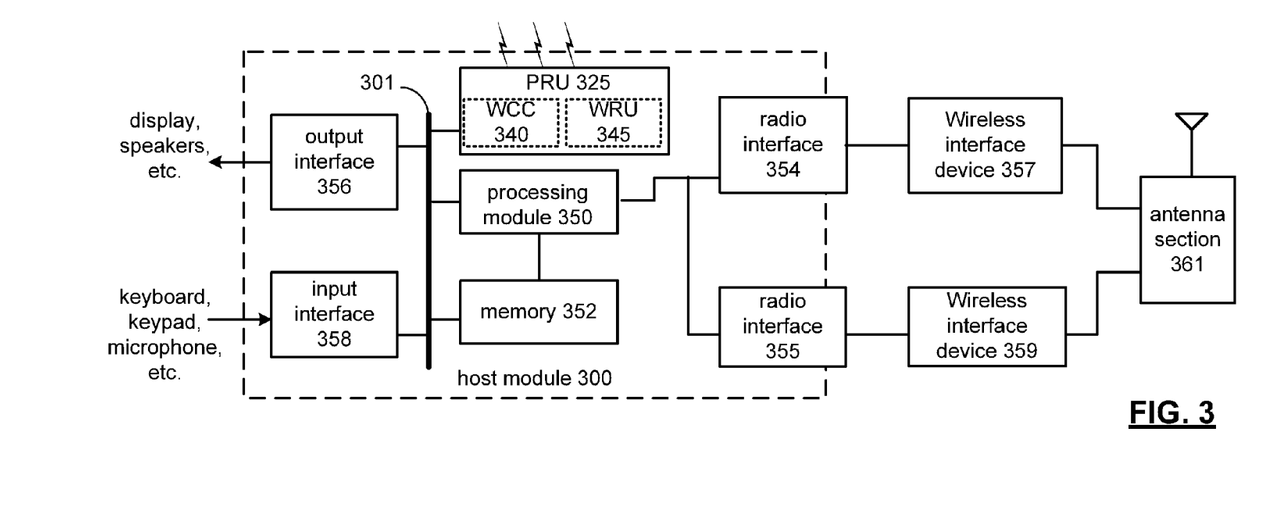
FIG. 3 is a schematic block diagram of an embodiment of a wireless communication device.

FIG. 3 is a schematic block diagram of an embodiment of a wireless communication device. A wireless communication device, such as 18, 20, 22, 24, 26, 28, 30, 32 or an associated peripheral device includes the host module 300 and one or more at least one wireless interface devices 357 and 359. The wireless interface devices 357 and 359 can be implemented via a wireless interface circuit with a single integrated circuit, or built in components of the host module 300, externally coupled components or part of a common integrated circuit that includes host module 300 and the components of the wireless interface devices 357 or 359.

As illustrated, the host module 300 includes a processing module 350, memory 352, power receiving unit 325, output interface 356, input interface 358, and radio interfaces 354 and 355. The processing module 350 and memory 352 execute the corresponding instructions that are typically performed by the wireless communication device 18, 20, 22, 24, 26, 28, 30, 32 or an associated peripheral device. For example, for a cellular telephone, tablet, Bluetooth device or WLAN node the processing module 350 performs the corresponding communication functions in accordance with a particular cellular telephone, Bluetooth or WLAN standard.

In the embodiment shown, the power receiving unit 325 wirelessly couples with a PTU, such as PTU 200 to implement wireless charging of the wireless communication device. In this embodiment, power receiving unit 325 includes a wireless charging circuit (WCC) 340 to receive wireless power transfers from the PTU and to charge the battery of the wireless communication device. The PRU 325 also includes a dedicated wireless radio unit (WRU) 345 to directly engage in the exchange of control data via a wireless connection. In an additional embodiment that is described further in conjunction with FIG. 5, the functionality of the WRU 345 is implemented via other radio components of the wireless communication device.

In one example of operation, PRU 325 operates in accordance with a loosely coupled wireless power transfer specification such as the A4WP baseline system specification 1.0 (BSS 1.0) or other wireless power transfer technology. In this example, a 6.78 MHZ signal is sent from the power transmitting unit 200 to the PRU 325 to transfer energy to charge the wireless communication device in conjunction with a charging session. Control information is exchanged between the PTU 200 and each of the PRU 325 via a 2.4 GHz Bluetooth LE compatible link to control the power transfer from the PTU to the PRU 325.

The radio interfaces 354 and 355 each communicate with a processing module 350 of the corresponding wireless interface device 357 or 359. These processing modules include a media-specific access control protocol (MAC) layer module and other processing functionality to support the features and functions of the particular wireless protocol employed by the wireless interface device and optionally to further perform additional functions and features of various embodiments as described herein.

The wireless interface devices 357 and 359 can include a digital-to-analog converter (DAC), an analog to digital converter (ADC), and a physical layer module (PHY) that operate via a cellular telephone standard such as a 3G or 4G or other standard, an 802.11 standard, a Bluetooth standard or in accordance with one or more other communication protocols. The radio interfaces 354 and 355 allow data to be received from and transmitted to external devices via the wireless interface devices 357 and 359 and antenna section 361. Antenna section 361 can include a single antenna or a plurality of antennas and appropriate impedance matching circuitry, diplexers, switches and or other components to couple the antenna section to the wireless interface devices 357 and 359. For example, the wireless communication device may be a personal or laptop computer, the external device may be an access point, base station, headset, personal digital assistant, cellular telephone, printer, fax machine, joystick, keyboard, or desktop telephone.

For data received from one of the wireless interface devices 357 or 359 (e.g., inbound data), the radio interface 354 or 355 provides the data to the processing module 350 for further processing and/or routing to the output interface 356. The output interface 356 provides connectivity to an output display device such as a display, monitor, speakers, etc. such that the received data may be displayed. The radio interfaces 354 and 355 also provide data from the processing module 350 to the wireless interface devices 357 and 359. The processing module 350 may receive the outbound data from an input device such as a keyboard, keypad, microphone, etc. via the input interface 358 or generate the data itself. For data received via the input interface 358, the processing module 350 may perform a corresponding host function on the data and/or route it to one of the wireless interface devices 357 or 359 via the corresponding radio interface 354 or 355.

Processing module 350 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 352 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 350 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. While a particular bus architecture is presented in conjunction with bus 301, other architectures are likewise possible.

In operation, the wireless charging circuit 340 receives a wireless power signal from a PTU, such as PTU 200, to charge the wireless communication device under control of the processing module 350 or a dedicated processor of PRU 325 and in conjunction with a charging session with the PTU. The WRU 345 operates under control of the processing module 350 or a dedicated processor of PRU 325 to establish a wireless connection with the PTU via a connection establishment procedure. The WRU 345 exchanges control data with the power transmitting unit via the wireless connection. The processing module 350 or a dedicated processor of PRU 325 uses the control data to implement the charging session between the PTU and the WCC 340.

When a disruption event occurs that creates a unilateral disconnection of the wireless connection from the power transmitting unit—such as a system reset in the processing module 350 or a dedicated processor of PRU 325 or other disruption, the WRU 345 responds by implementing a restoration procedure in an attempt to restore the wireless connection. If the wireless connection can be restored prior to expiration of a supervisory time out period of the PTU, there is no need to implement a full connection establishment procedure. Considering again the case where the wireless connection is a Bluetooth LE compatible link, the restoration operates without the normal advertisement, inquiry and/or page procedures associated with standard connection establishment. Further, the charging session can continue during the disruption event. If the WRU 345 determines that the restoration procedure fails to restore the wireless connection—the standard connection establishment procedure can be implemented in response.

While the connection restoration procedures have been described above in conjunction with the operation of PRU 325, these procedures can also be employed in other wireless connections established in conjunction with wireless interface devices 357 and 359.

Figure 4:
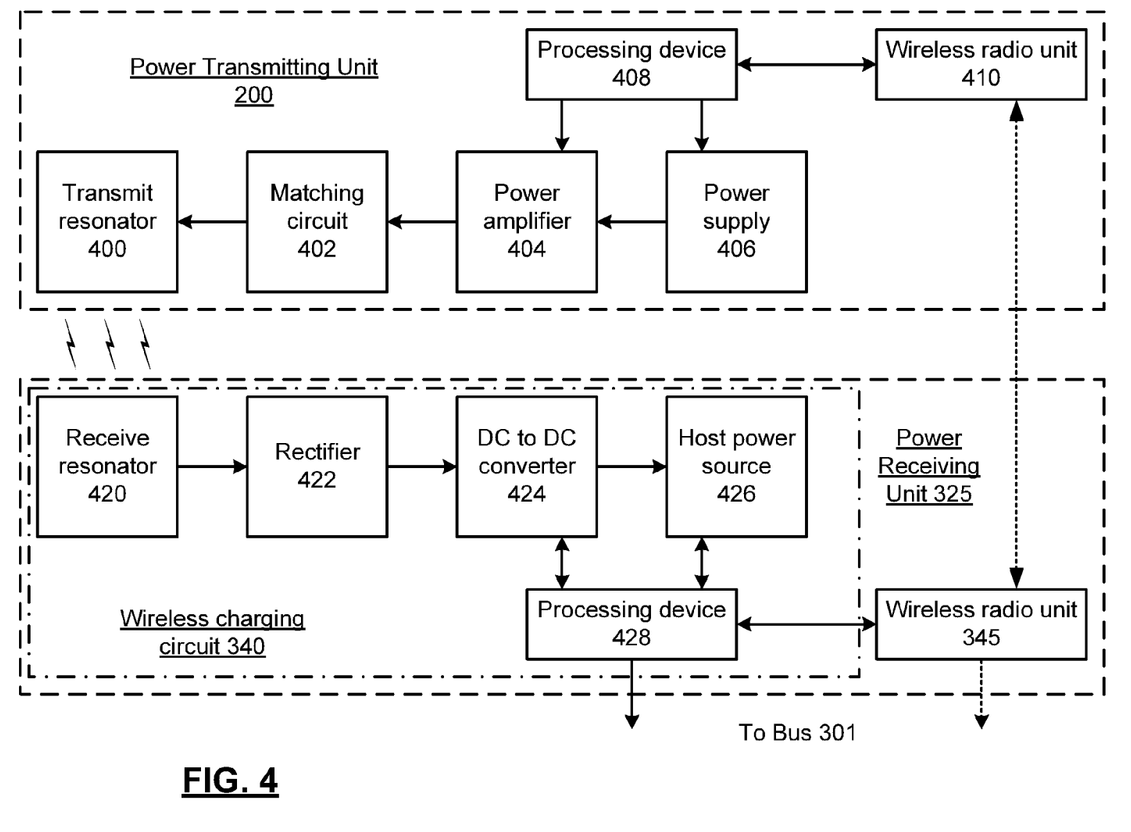
FIG. 4 is a schematic block diagram of an embodiment of a power transmitting unit and a power receiving unit.

FIG. 4 is a schematic block diagram of an embodiment of a power transmitting unit and a power receiving unit. In particular, PTU 200 includes a transmit resonator 400, matching circuit 402, power amplifier 404, power supply 406, processing device 408 and wireless radio unit 410. PRU 325 includes a wireless charging circuit 340 that includes a receive resonator 420, a rectifier 422, a DC-to-DC converter 424, a host power source 426 a processing device 428. In addition, PRU 325 includes the wireless radio unit 345 as previously described.

In operation, the wireless charging circuit 340 receives a wireless power signal from PTU 200 to charge the host power source 426 under control of the processing device 428. The WRU 345 also operates under control of the processing device 428 to establish a wireless connection with the WRU 410 of PTU 200 via a connection establishment procedure. The WRU 345 exchanges control data with the power transmitting unit 200 via the wireless connection to establish a charging session. Processing device 408 controls the operation of power supply 406 and power amplifier 404 to generate an RF power signal. The matching circuit 402 couples the RF power signal to the transmit resonator 400 for transmission. The RF power signal is received by the receive resonator 420, rectified by rectifier 422 and converted into a DC charging signal by DC-to-DC converter 424 for charging of the host power source 426. Processing device 428 monitors and controls the charging to, for example, avoid over-voltage and under-voltage conditions, high temperature events, and/or other detrimental conditions. The functionality ascribed to processing device 428 can be implemented via processing module 350 or via one or more separate processing devices.

Figure 5:
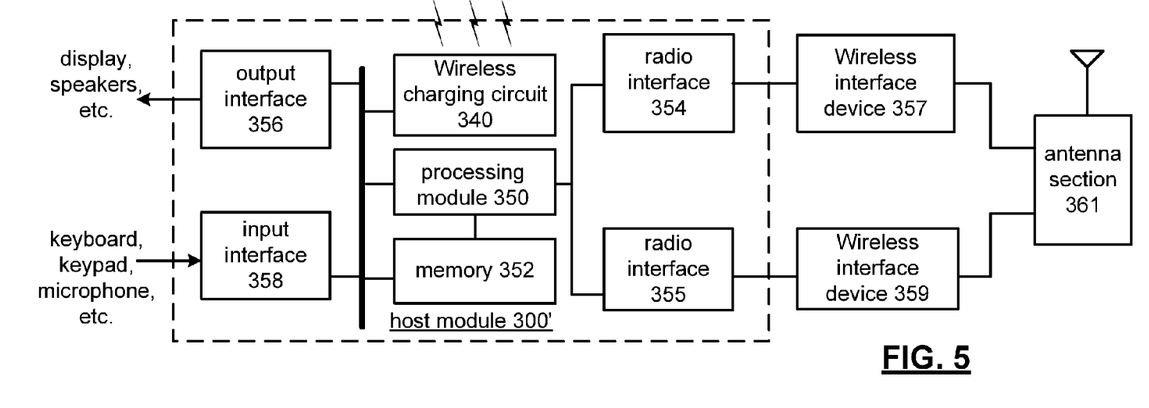
FIG. 5 is a schematic block diagram of another embodiment of a wireless communication device.

FIG. 5 is a schematic block diagram of another embodiment of a wireless communication device. In particular, a wireless communication device is presented that includes many similar elements and features described in conjunction with FIG. 3 that are referred to by common reference numerals. In this embodiment, host module 300' operates in a similar fashion to host module 300. However, the wireless charging circuit 340 is coupled to bus 301 and the functionality of the wireless radio unit 345 is implemented in conjunction with either the wireless interface device 357 or wireless interface device 359. In this fashion, an existing wireless interface device 357 or 359 can be used or reused for this purpose.

Consider again the example where the WCC 340 operates in accordance with a loosely coupled wireless power transfer specification such as the A4WP baseline system specification 1.0 (BSS 1.0) or other wireless power transfer technology. Control information is exchanged between the WCC 340 and the PTU 200 via a 2.4 GHz Bluetooth LE compatible link implemented via wireless interface device 357 or 359. In this fashion, a smartphone with an existing Bluetooth radio can use this radio for traditional Bluetooth communication as well as wireless connection in conjunction with wireless charging via wireless charging circuit 340. Further the connection restoration procedures previously described in conjunction with FIGS. 1-4 can be employed not only in the operation of Bluetooth LE used in conjunction with wireless charging, but in other wireless connections established in conjunction with wireless interface devices 357 and 359.

Figure 6:
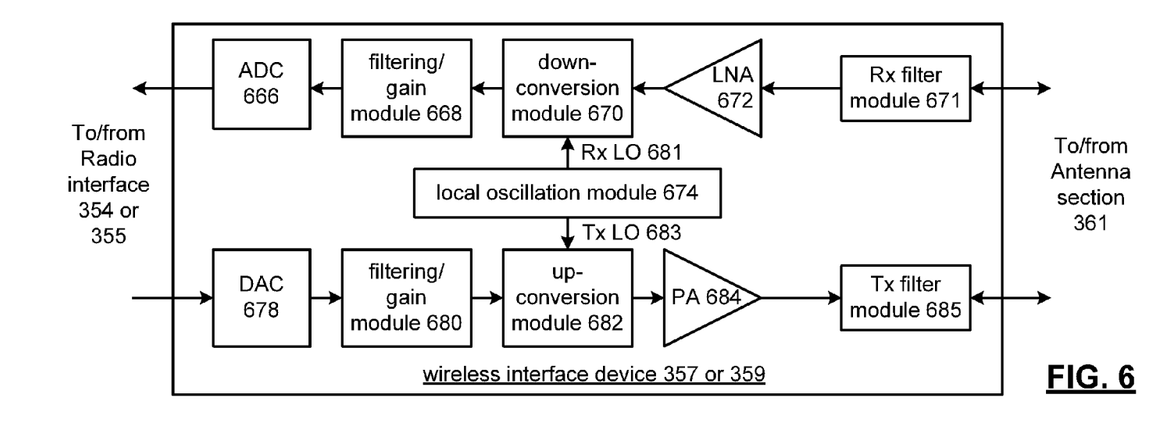
FIG. 6 is a schematic block diagram of an embodiment of a wireless interface device.

FIG. 6 is a schematic block diagram of an embodiment of a wireless interface device. In particular, wireless interface device 357 or 359 includes an analog-to-digital converter (ADC) 666, a filtering/gain module 668, an IF mixing down conversion stage 670, a receiver filter 671, a low noise amplifier 672, a transmitter/receiver switch a local oscillation module 674, a digital-to-analog converter (DAC) 678, a filtering/gain module 680, an IF mixing up conversion stage 682, a power amplifier 684, and a transmitter filter module 685. The transmitter/receiver switch is coupled to a single antenna of the antenna section 361. Alternatively, the antenna section 361 may include separate antennas for the transmit path and receive path of each wireless interface device 357 or 359.

Returning to the discussion of FIGS. 3 and 5, the processing module 350 can execute digital receiver functions and digital transmitter functions in accordance with a particular wireless communication standard via one or more dedicated processors or via a shared processor. The digital receiver functions can include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. In operation, outbound data from the host module 300 is processed in accordance with a particular wireless communication standard (e.g., IEEE 802.11 including all current and future subsections, Bluetooth, etcetera) to produce digital transmission formatted data that is received via the radio interface 354 or 355. The digital transmission formatted data can be a digital base-band signal or a digital low IF signal, where the low IF typically will be in the frequency range of one hundred kilohertz to a few megahertz. The digital-to-analog converter 678 converts the digital transmission formatted data from the digital domain to the analog domain. The filtering/gain module 680 filters and/or adjusts the gain of the analog signal prior to providing it to the IF mixing stage 682. The IF mixing stage 682 directly converts the analog baseband or low IF signal into an RF signal based on a transmitter local oscillation 683 provided by local oscillation module 674. The power amplifier 684 amplifies the RF signal to produce an outbound RF signal, which is filtered by the transmitter filter module 685. The antenna section 361 transmits the outbound RF signal to a targeted device such as a base station, an access point, peripheral PTU 200 and/or another wireless communication device.

The wireless interface device 357 or 359 also receives an inbound RF signal via the antenna section 361, which was transmitted by a base station, an access point, PTU 200 or another wireless communication device. The antenna section 361 provides the inbound RF signal to the receiver filter module 671 via the Tx/Rx switch, where the Rx filter 671 bandpass filters the inbound RF signal. The Rx filter 671 provides the filtered RF signal to low noise amplifier 672, which amplifies the signal to produce an amplified inbound RF signal. The low noise amplifier 672 provides the amplified inbound RF signal to the IF mixing module 670, which directly converts the amplified inbound RF signal into an inbound low IF signal or baseband signal based on a receiver local oscillation 681 provided by local oscillation module 674. The down conversion module 670 provides the inbound low IF signal or baseband signal to the filtering/gain module 668. The filtering/gain module 668 filters and/or gains the inbound low IF signal or the inbound baseband signal to produce a filtered inbound signal.

The analog-to-digital converter 666 converts the filtered inbound signal from the analog domain to the digital domain to produce digital reception formatted data. This data is passed via radio interface 354 or 355 to processing module 350 which decodes, descrambles, demaps, and/or demodulates the digital reception formatted data to recapture inbound data in accordance with the particular wireless communication standard being implemented by wireless interface device.

While FIG. 6 shows the wireless interface devices 357 and 359 as being implemented with separate components, one or more modules or components of these devices can be implemented with shared components that operate for both wireless interface devices. For instance, a single LNA 672 and RX filter module 671 can be used by wireless interface devices 357 and 359 to filter and amplify inbound RF signals, a single reference oscillator, such as a crystal oscillator, can be used in local oscillation modules 674 of both wireless interface devices as the basis for generating separate local oscillation signals 681 and 683, etcetera.

Figure 7:
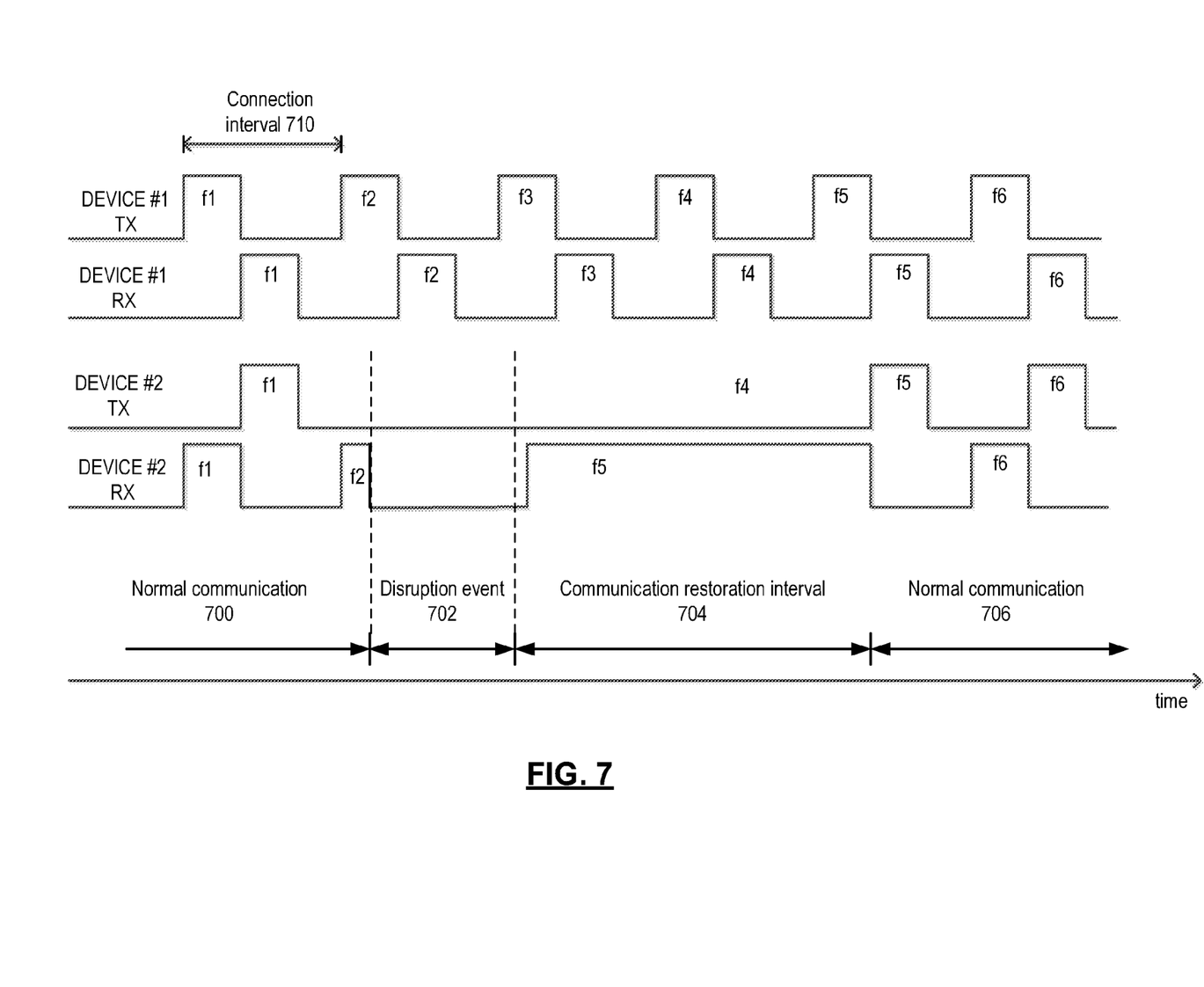
FIG. 7 is a timing diagram that illustrates an embodiment of connection restoration.

FIG. 7 is a timing diagram that illustrates an embodiment of connection restoration. Separate lines are used to indicate receive and transmit periods of two different communication devices, Device #1 and Device#2, that have already established a wireless connection. In this embodiment, the wireless connection includes a plurality of frequency hops (f1, f2, f3, f4, f5, f6, . . . ) occurring in a corresponding plurality of hop intervals, in the case represented by connection interval 710.

In the first connection interval of normal communication 700, Device#1 transmits and Device#2 receives in a first portion of the connection interval via frequency channel f1. This is followed by a second portion of the interval where Device#2 transmits and Device#1 receives via frequency channel f1. Normal communication 700 continues with a shift to frequency channel f2 where Device#1 transmits and Device#2 receives—however this interval is interrupted by a disruption event 702 that disrupts the operation of Device#2. While Device#1 continues on with a normal transmission and reception schedule, however transmission and reception by Device#2 ceases during this period of time.

When Device#2 emerges from the disruption event 702, it implements a restoration procedure in an attempt to restore the wireless connection without performing a reestablishment. The restoration procedure predicts a subsequent frequency hop (f5) of Device#1. The subsequent frequency hop (f5) can be predicted based on, for example, the expiration of the supervisory time out period of the power transmitting unit that defines the time the device waits to drop an established connection in response to inactivity of the connection. Other information, if available can be used in the prediction. For example, frequencies of one or more past frequency hops that occurred prior to the disruption and/or a pattern of frequency hops can be used in prediction along with any timing information that may be available. In this case, Device#1 received only a partial response in connection intervals corresponding to f2. If, for example, Device#1 would time out the wireless connection after four unsuccessful connection intervals, Device#2 predicts that Device#1 will transmit at frequency f5 in the last connection interval before the expiration of its supervisory time out period.

Device#2 implements an extended reception window to wait for Device#1 to transmit at f5 during a subsequent connection interval. This extended window has a longer duration than the standard duration and is used to wait for Device#1 to transmit during a subsequent connection interval at this frequency. The communication restoration interval 704 ends when Device#2 detects the transmission from Device#2 and subsequently transmits its own response at f5. Normal communication 706 continues at that point.

Consider the example where Device#1 is a PTU 200 and Device#2 is a wireless communication device that includes or operates as a PRU as previously described. The A4WP specification defines a 250 ms connection interval 710 and a 1 second supervision timeout. When the connection on the PRU is disrupted, for example by a system reset, conventional PRUs would respond by restarting advertisement. Supervision timeout on the PTU would meanwhile occur. The PTU would thereafter re-issue a connection request after seeing the new advertisement as part of the standard connection establishment procedure.

In the case of wireless communication devices described in conjunction with FIGS. 1-6 however, the PRU implements a restoration procedure. Depending on how much time is left after a unilateral disconnection occurs on the PRU, the PRU may choose not to restart the complete connection procedure. Instead, PRU predicts when a supervisory timeout is expected to occur based on the time of the disruption event. The PRU looks to detect the last hop connection event from the PTU (the connection interval corresponding to hop frequency f5) before unilateral disconnection by the PTU. PRU resynchronizes with the PTU upon the detection of such an event. The connection is therefore restored while the PTU is unaware of the disruption—and charging can persistent.

Figure 8:
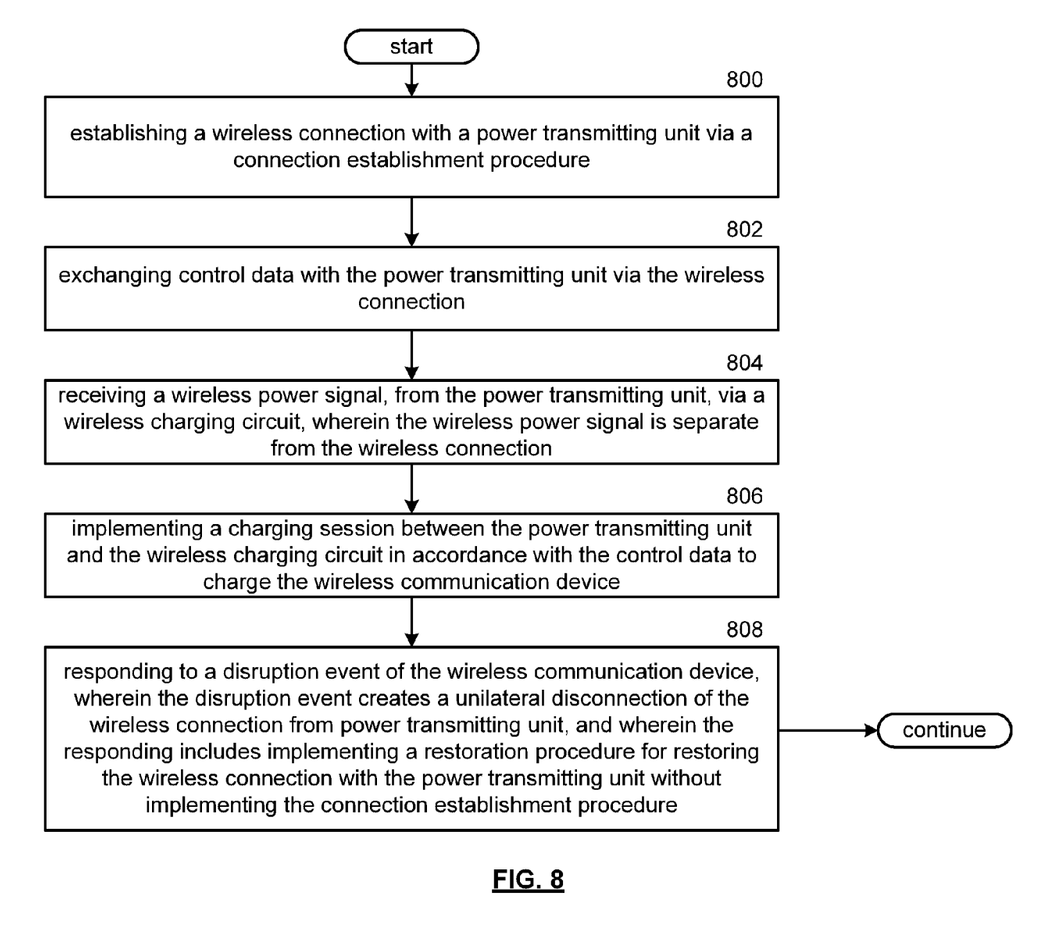
FIG. 8 is a flowchart representation an embodiment of a method.

FIG. 8 is a flowchart representation an embodiment of a method. In particular, a method is presented for use in conjunction with one or more features and functions described in conjunction with FIGS. 1-7. Step 800 includes establishing a wireless connection with a power transmitting unit via a connection establishment procedure, step 802 includes exchanging control data with the power transmitting unit via the wireless connection. Step 804 includes receiving a wireless power signal, from the power transmitting unit, via a wireless charging circuit, wherein the wireless power signal is separate from the wireless connection. Step 806 includes implementing a charging session between the power transmitting unit and the wireless charging circuit in accordance with the control data to charge the wireless communication device. Step 808 includes responding to a disruption event of the wireless communication device, wherein the disruption event creates a unilateral disconnection of the wireless connection from power transmitting unit, and wherein the responding includes implementing a restoration procedure for restoring the wireless connection with the power transmitting unit without implementing the connection establishment procedure.

In an embodiment, the wireless charging session is in accordance with an Alliance for Wireless Power specification and the wireless connection is formatted in accordance with a Bluetooth Low Energy protocol. The disruption event can include a system reset of the wireless communication device. The charging session can continue during the disruption event. Restoring the wireless connection includes restoring the wireless connection before expiration of a supervisory time out period of the power transmitting unit. The wireless connection can include a plurality of frequency hops occurring in a corresponding plurality of hop intervals, and restoring the wireless connection can include predicting a subsequent frequency hop of the power transmitting unit. The subsequent frequency hop can be predicted based on reviewing a past frequency hop that occurred prior to the disruption event and predicting the subsequent frequency hop based on the past frequency hop and the supervisory time out period of the power transmitting unit. Restoring the wireless connection can include extending a reception window beyond a standard duration used in a standard wireless connection interval.

Figure 9:
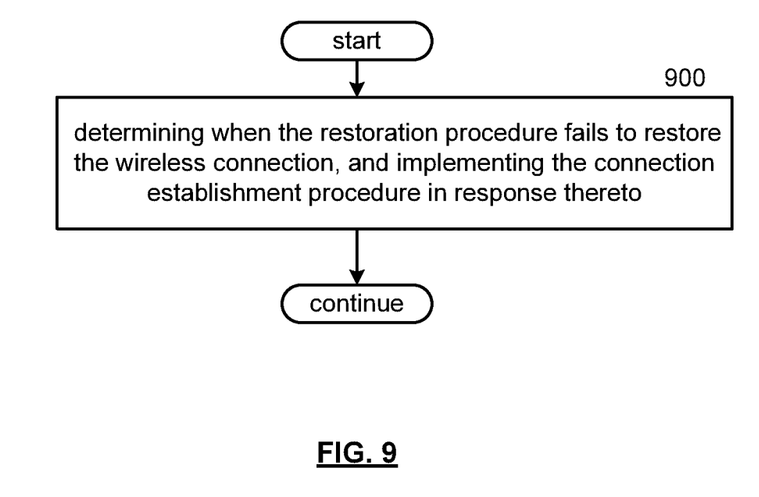
FIG. 9 is a flowchart representation an embodiment of a method.

FIG. 9 is a flowchart representation an embodiment of a method. In particular, a method is presented for use in conjunction with one or more features and functions described in conjunction with FIGS. 1-8. Step 900 includes determining when the restoration procedure fails to restore the wireless connection, and implementing the connection establishment procedure in response thereto.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Various embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

A physical embodiment of an apparatus, an article of manufacture, a machine, and/or of a process that includes one or more embodiments may include one or more of the aspects, features, concepts, examples, etc. described with herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features have been expressly described herein, other combinations of these options, methods, functions and features are likewise possible. The various embodiments are not limited by the particular examples disclosed herein and expressly incorporates these other combinations.

What is claimed is:

1. A wireless communication device comprising:
   a processing device;
   a wireless charging circuit, coupled to the processing device, configurable to receive a wireless power signal from a power transmitting unit and to charge the wireless communication device under control of the processing device and in conjunction with a charging session with the power transmitting unit;
   a wireless interface device, coupled to the processing device and the wireless charging circuit, wherein the wireless interface device operates under control of the processing device to:
      establish a wireless connection with the power transmitting unit via a connection establishment procedure, wherein the wireless connection is separate from the wireless power signal;
      exchange control data with the power transmitting unit via the wireless connection, wherein the control data is usable by the processing device to implement the charging session with the wireless charging circuit; and
      generate a response to a disruption event of the wireless communication device, wherein the disruption event creates a unilateral disconnection of the wireless connection from the power transmitting unit, and wherein the response includes implementing a restoration procedure for restoring the wireless connection without implementing the connection establishment procedure.

2. The wireless communication device of claim 1 wherein the wireless charging circuit, the processing device and the wireless interface device operate as a power receiving unit in accordance with an Alliance for Wireless Power specification.

3. The wireless communication device of claim 1 wherein the wireless interface device operates in accordance with a Bluetooth Low Energy protocol.

4. The wireless communication device of claim 1 wherein the disruption event includes a system reset of at least the processing device.

5. The wireless communication device of claim 1 wherein the charging session continues during the disruption event.

6. The wireless communication device of claim 1 wherein restoring the wireless connection includes restoring the wireless connection before expiration of a supervisory time out period of the power transmitting unit.

7. The wireless communication device of claim 6 wherein the wireless connection includes a plurality of frequency hops occurring in a corresponding plurality of hop intervals, and wherein restoring the wireless connection includes predicting a subsequent frequency hop of the power transmitting unit.

8. The wireless communication device of claim 7 wherein predicting the subsequent frequency hop includes reviewing a past frequency hop that occurred prior to the disruption event and predicting the subsequent frequency hop based on the past frequency hop and the supervisory time out period of the power transmitting unit.

9. The wireless communication device of claim 1 wherein restoring the wireless connection includes extending a reception window of the wireless interface device beyond a standard duration used in the wireless connection.

10. The wireless communication device of claim 1 wherein the wireless interface device further operates under control of the processing device to:

determine when the restoration procedure fails to restore the wireless connection, and implementing the connection establishment procedure in response thereto.

11. A method for use in a wireless communication device, the method comprising:
establishing, via a wireless interface device, a wireless connection with a power transmitting unit via a connection establishment procedure;
exchanging control data, via the wireless interface device, with the power transmitting unit via the wireless connection;
receiving a wireless power signal, from the power transmitting unit, via a wireless charging circuit, wherein the wireless power signal is separate from the wireless connection;
implementing a charging session between the power transmitting unit and the wireless charging circuit in accordance with the control data to charge the wireless communication device; and
responding, via the wireless interface device, to a disruption event of the wireless communication device, wherein the disruption event creates a unilateral disconnection of the wireless connection from power transmitting unit, and wherein the responding includes implementing a restoration procedure for restoring, via the wireless interface device, the wireless connection with the power transmitting unit without implementing the connection establishment procedure.

12. The method of claim 11 wherein the wireless charging session is in accordance with an Alliance for Wireless Power specification.

13. The method of claim 11 wherein the wireless connection is formatted in accordance with a Bluetooth Low Energy protocol.

14. The method of claim 11 wherein the disruption event includes a system reset of the wireless communication device.

15. The method of claim 11 wherein the charging session continues during the disruption event.

16. The method of claim 11 wherein restoring the wireless connection includes restoring the wireless connection before expiration of a supervisory time out period of the power transmitting unit.

17. The method of claim 16 wherein the wireless connection includes a plurality of frequency hops occurring in a corresponding plurality of hop intervals, and wherein restoring the wireless connection includes predicting a subsequent frequency hop of the power transmitting unit.

18. The method of claim 17 wherein predicting the subsequent frequency hop includes reviewing a past frequency hop that occurred prior to the disruption event and predicting the subsequent frequency hop based on the past frequency hop and the supervisory time out period of the power transmitting unit.

19. The method of claim 11 wherein restoring the wireless connection includes extending a reception window beyond a standard duration used in the wireless connection.

20. A wireless communication device comprising:
a wireless charging circuit configurable to receive a wireless power signal from a power transmitting unit and to charge the wireless communication device in conjunction with a charging session with the power transmitting unit in accordance with an Alliance for Wireless Power specification;
a wireless interface device, coupled to the wireless charging circuit, wherein the wireless interface device operates to:
establish a wireless connection with the power transmitting unit via a connection establishment procedure, wherein the wireless connection is separate from the wireless power signal and is formatted in accordance with a Bluetooth Low Energy protocol;
exchange control data with the power transmitting unit via the wireless connection to implement the charging session with the wireless charging circuit; and
generate a response to a disruption event of the wireless communication device, wherein the disruption event creates a unilateral disconnection of the wireless connection from the power transmitting unit, and wherein the response includes implementing a restoration procedure for restoring the wireless connection without implementing the connection establishment procedure.

\* \* \* \* \*